(12) United States Patent
Kuo

(10) Patent No.: US 7,057,351 B2
(45) Date of Patent: Jun. 6, 2006

(54) EMERGENCY LIGHTING FUNCTION ILLUMINATION APPLIANCE

(76) Inventor: Chao-Tung Kuo, 6F., No. 231, Hsin Tung Street, Taipei (TW)

( * ) Notice: Subject to any disclaimer, the term of this patent is extended or adjusted under 35 U.S.C. 154(b) by 53 days.

(21) Appl. No.: 10/849,916

(22) Filed: May 21, 2004

(65) Prior Publication Data
US 2005/0200288 A1    Sep. 15, 2005

(30) Foreign Application Priority Data
Mar. 15, 2004    (TW) .............................. 93203868 U

(51) Int. Cl.
*H05B 37/00* (2006.01)

(52) U.S. Cl. ................. 315/86; 315/209 R; 307/66
(58) Field of Classification Search ................ 315/86, 315/87, 209 R, 219, 224, 291; 362/20; 307/66
See application file for complete search history.

(56) References Cited

U.S. PATENT DOCUMENTS

| | | | | |
|---|---|---|---|---|
| 5,677,603 A | * | 10/1997 | Speirs et al. | 315/324 |
| 5,859,499 A | * | 1/1999 | McAfee et al. | 315/86 |
| 6,107,744 A | * | 8/2000 | Bavaro et al. | 315/86 |

* cited by examiner

*Primary Examiner*—Don Wong
*Assistant Examiner*—Jimmy Vu
(74) *Attorney, Agent, or Firm*—Rosenberg, Klein & Lee

(57) ABSTRACT

An emergency lighting function illumination appliance comprised of a fluorescent lamp tube, a controller, a mains power circuit capable of processing mains electricity for lighting, and a backup circuit that provides for a reserve power source. By integrating these devices, renovation of existent wiring is not required for installation. When mains electricity is normally supplied, an ON-OFF switching approach controls the illumination and extinguishment of the fluorescent lamps, but during mains electricity failures, a power circuit automatically shifts to a backup circuit that furnishes reserve power to provide for emergency lighting. Furthermore, when mains electricity supply is restored, the power circuit is automatically shifted to the mains power circuit such that ordinary lighting function is once again reliant on mains electricity.

2 Claims, 5 Drawing Sheets

EMERGENCY LIGHTING FUNCTION ILLUMINATION APPLIANCE

BACKGROUND OF THE INVENTION

1) Field of the Invention

The invention herein relates to emergency lighting equipment, specifically an emergency lighting function illumination appliance that integrates ordinary lighting and emergency lighting into a single piece of equipment.

2) Description of the Prior Art

Conventional emergency lighting equipment is a type of appliance that continues to provide illumination during failures of normal power (commercial mains electricity) distribution with the purpose of maintaining minimal visibility in homes, work places, and shelter passageways to thereby enable a short period of time to conclude work or facilitate evacuation guidance. Evacuation guidance devices includes exit indicator lights over safety doors and various hallway direction signs, their installation allowing identification of evacuation passageways and safety door locations in the dark. As living quality has risen in recent years, building design has in addition to emphasizing comfort also been required to take safety into consideration.

Conventional emergency lighting equipment now available on the market are mainly wall-mounted emergency lighting fixtures. Such emergency lighting is typically installed in several places along hallways, stairs, passageways, and other ordinarily illuminated areas that must be traversed during evacuations. In most cases, the emergency lighting is internally equipped with an AC-DC automatically switching device, wherein alternating current (AC) automatically charges a backup battery and automatically ceases when a full charge is reached. In the event of a power outage, the device automatically switches to a backup circuit which supplies power for emergency illumination.

However, since emergency lighting is designed for stand alone use in various areas, consumers can purchase them individually for indoor installation. Such emergency lighting is only placed along hallways, stairs, passageways, and other ordinarily illuminated areas that must be passed through during evacuations to highlight their locations and, therefore, the illuminated areas are limited and, furthermore, due to their wall-mount design, light is only directed onto walls, which is a further curbs area coverage.

Consequently, lighting equipment, such as fluorescent lamps, in most homes and work places are of a switch-based design, enabling circuit opening and closure for controlling fluorescent operation on and off. As a result, mains power must be supplied before fluorescent lamps can provide illumination. Conversely, conventional emergency lighting operation is the opposite of conventional lighting equipment; illumination is provided when mains power fails and the lighting automatically terminates when normal mains power supply resumes. As such, the applicant of the invention herein thought to provide a new type of lighting equipment, the said equipment utilizing fluorescent lamp tube, light bulb, or light-emitting diode (LED) such that the fluorescent lamp tube, light bulb, or light-emitting diode (LED) typically utilized for ordinary lighting still retains lighting capability during mains power outages and, therefore, integrated both an ordinary lighting device and a emergency lighting device into one single structural entity.

The most difficult aspect of integration is how to differentiate between power outage and user switch offs. The market solution approach is to use a three-wire circuit for control (building circuits must be re-configured), a few utilize remote controllers, and some use cords to operate switches; in short, the conventional market does lacks a technology that is economical and convenient.

SUMMARY OF THE INVENTION

The objective of the invention herein is to provide an emergency lighting function illumination appliance to save the expense of additionally purchasing emergency lighting.

Another objective of the invention herein is to provide an emergency lighting function illumination appliance that has lighting capability when mains power is normally supplied and also during mains power outages.

The present invention provides for the integration of an emergency illumination device and an ordinary illumination device into one unit. The most attractive part of this invention is that the circuit layout of the building needs not to be modified. Thus, to reduce expenditures, increase lighting area coverage, and facilitate evacuation efficiency.

To further elaborate, under such a concept, the invention herein is utilized on a fluorescent lamp and is comprised a fluorescent lamp tube and a controller, the controller capable of distinguishing whether mains power is being normally supplied to thereby determine when the fluorescent lamp should be operated by mains power or by a backup power source. A mains power circuit (switching ballast/electrical ballast) provides for powering the fluorescent lamp when mains power is available and a backup circuit provides for powering the fluorescent lamp by a backup power source during mains power outages. Additionally, when mains power is normally supplied, the user turns on or off of the fluorescent lamp with a switch (the special switch generates voltage or current pulse) to thereby achieve user requirements.

DETAILED DESCRIPTION OF THE INVENTION

Figure 1:
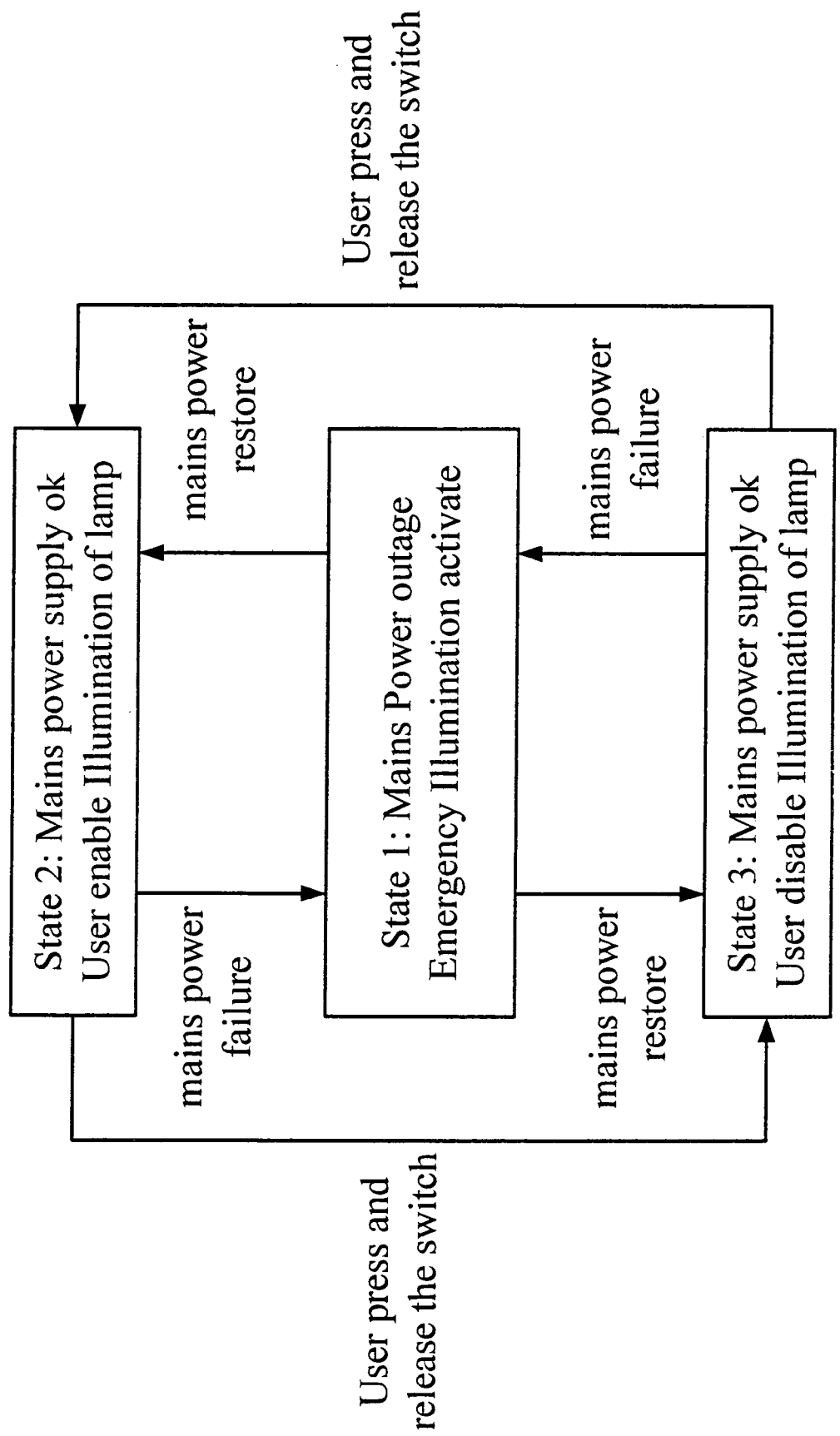
FIG. 1 is a state chart of the most preferred embodiment of the invention herein.

The invention herein utilizes fluorescent lamp technological content, features, and functions. To enable a further understanding, the brief description of the drawings is followed by the detailed description of the most preferred embodiment of the invention herein.

When conventional fluorescent lamp available on the market normally utilize commercial mains electricity, the user toggles a switch to control fluorescent lamp continuity or discontinuity with power and thereby effectively achieve lamp illumination and extinguishment; however, the design of conventional fluorescent lamp is such that they are incapable of distinguishing between a normal power and a power outage situation; to integrate an emergency illumination device and an ordinary illumination device into one unit, under normal mains power conditions, the design herein utilizes a special device, the controller of the invention herein, which after processing generates different level electrical signals to thereby control fluorescent lamp on and off switching using a new method; in other words, when mains power is normally supplied, whether in an illuminative state or a non-illuminative state, the fluorescent lamp remains in continuity with voltage and current. The electricity or current passed to the fluorescent lamp won't be cut off by switch (except when the switch is pressed). Instead, the switch only generates pulse signals when toggled. To achieve these objectives, the fluorescent lamp power supply switch must be maintained in a state of constant continuity (always ON); a state of discontinuity is established when the switch button is pressed and a state of continuity is automatically restored when it is no longer pressed, thereby resulting in instantaneous power termination; when the user switches on the lamp or switches off the lamp, the switch itself generates voltage or current pulse signals due to the abruptness of power termination and, furthermore, the controller which inside the fluorescent lamp is detecting and processing the said pulse signal enables or disables illumination of the fluorescent lamp as user requirements. (an approach that is different from that of conventional switched lamps now on the market); during a mains power outage, the controller of the invention herein automatically shifts the fluorescent lamp circuit to the backup circuit, the backup power supply providing electricity to power the fluorescent lamp as it enters the emergency illumination mode, which is among the features of the invention herein. To elaborate, referring to FIG. 1, wherein State 1 is during a mains power outage, the controller of the invention herein automatically shifts the fluorescent lamp power supply circuit to the backup circuit backup power source to furnish power for emergency lighting; State 2 and State 3 are during normal mains power supply, wherein State 2 is the user switching on the fluorescent lamp and State 3 is the user switching off the fluorescent lamp. During a mains power outage, whether the fluorescent lamp is originally in State 2 or State 3, the equipment of the invention herein automatically shifts the fluorescent lamp power supply circuit to State 1 for emergency lighting.

Figure 2:
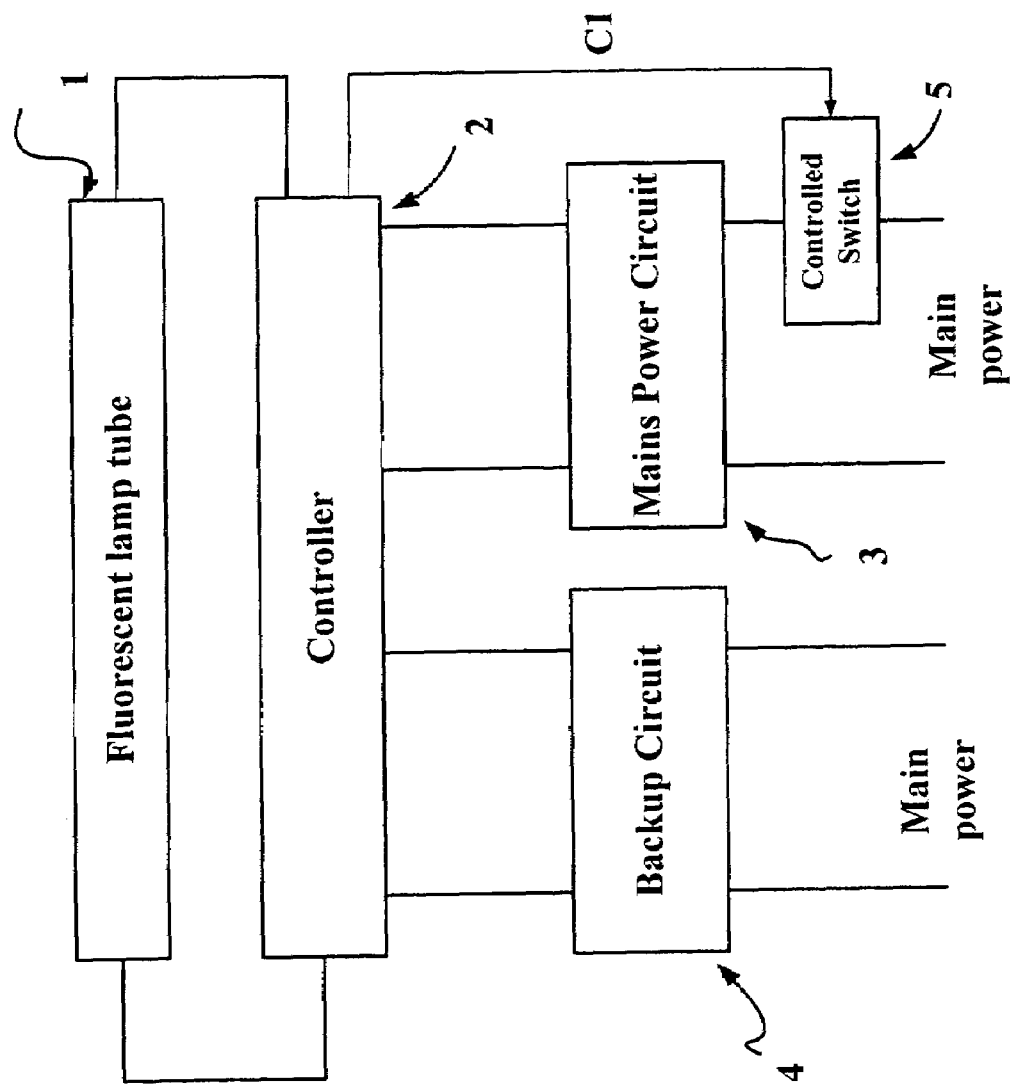
FIG. 2 is a block diagram of the invention herein.

As indicated in FIG. 2, the preferred embodiment emergency lighting function illumination appliance of the invention herein has a fluorescent lamp tube 1, a controller 2, a mains power circuit 3, a back up circuit 4, and a controlled switch 5 controlled by a signal C1 such that the fluorescent lamp tube 1 is operated by the controller 2, which selects mains power supplied from the mains power circuit 3 or selects backup power from the backup circuit 4.

Figure 3:
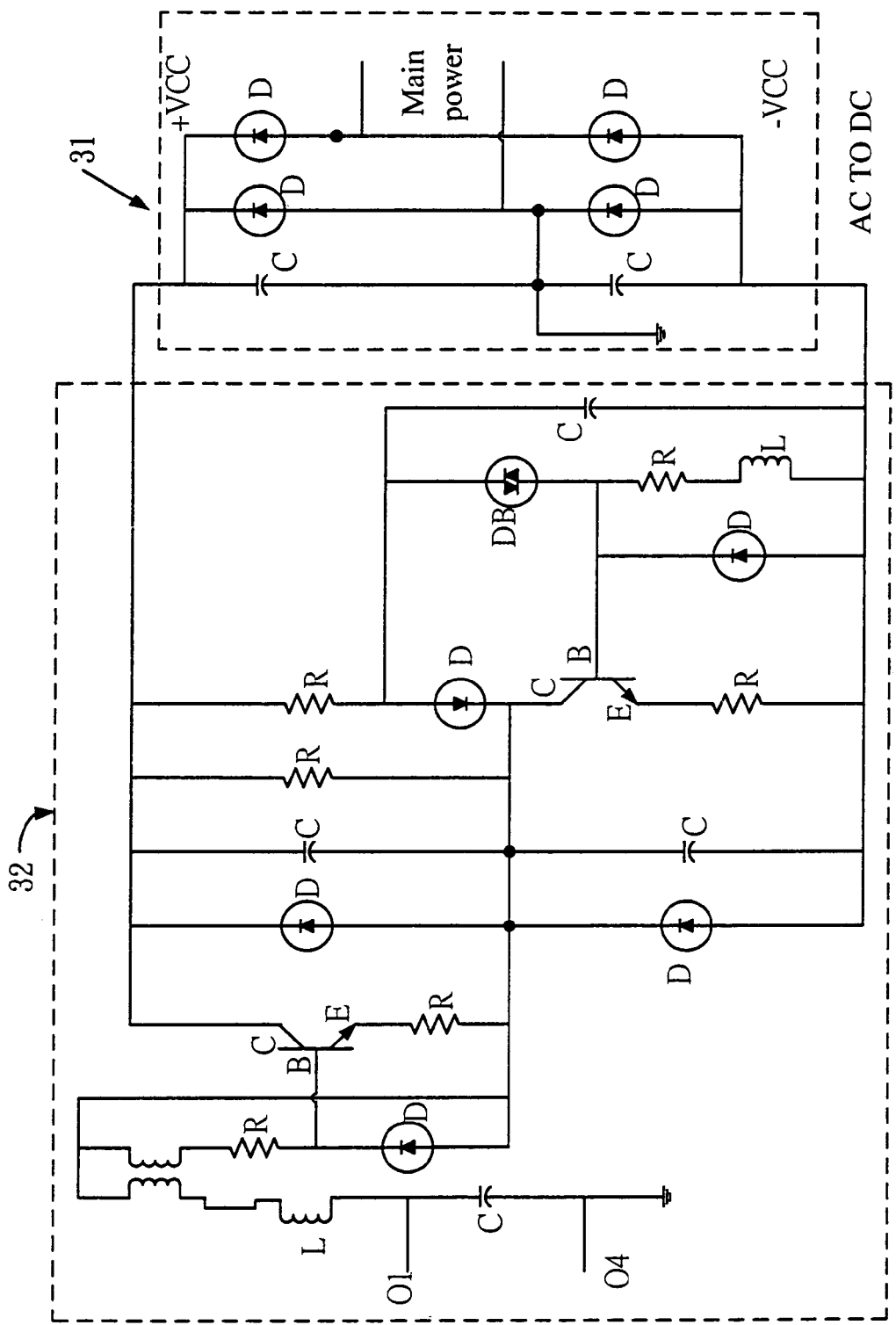
FIG. 3 is a schematic diagram of the mains power circuit 3 in FIG. 2.
Figure 4:
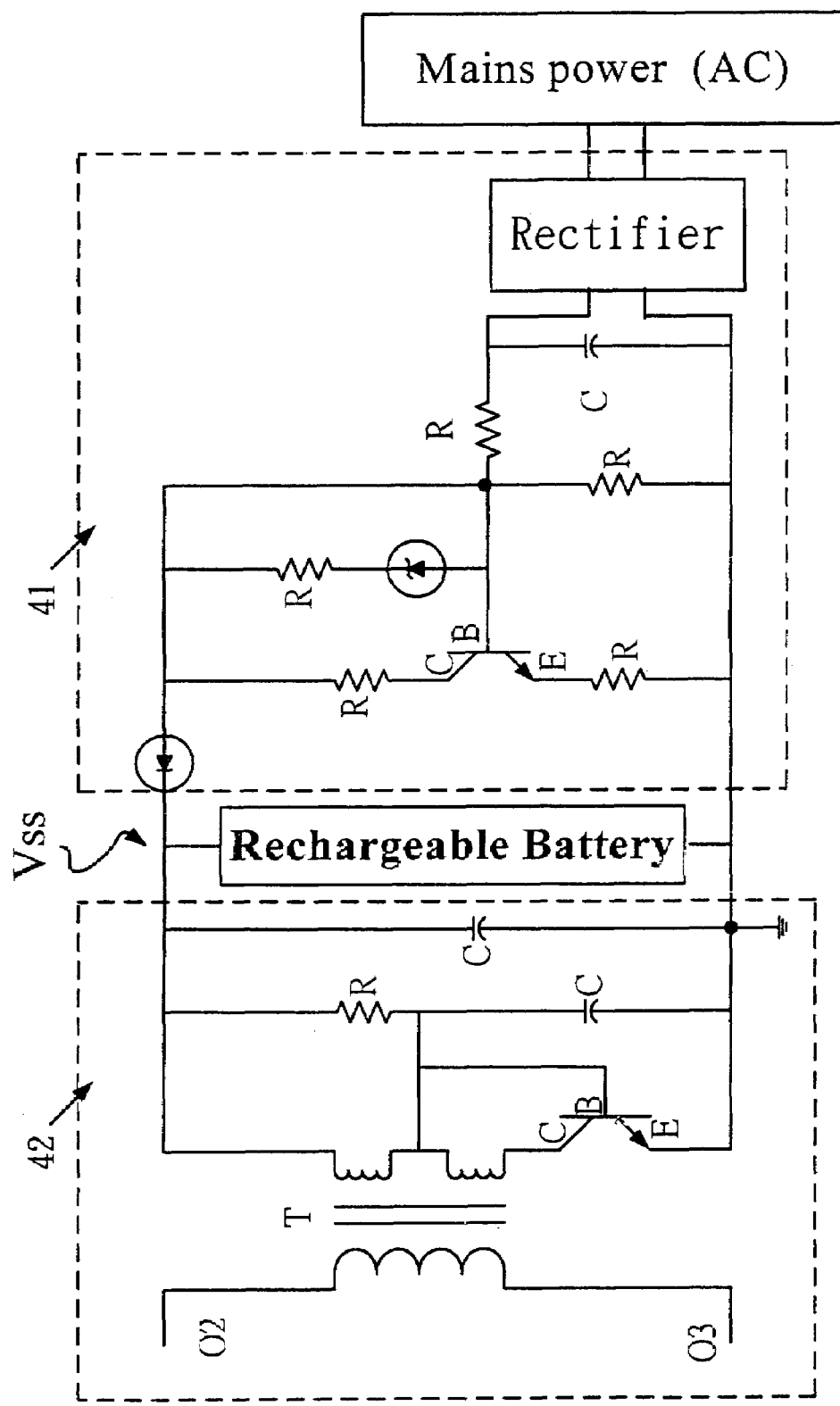
FIG. 4 is a schematic diagram of the backup circuit 4 in FIG. 2.

As indicated in FIG. 3, the mains power circuit 3 is an switching ballast (electrical ballast) utilized to convert and process mains power appropriately to drive the fluorescent lamp tube 1 that consists of an AC-to-DC converter circuit 31, and an oscillator circuit 32. The AC-to-DC converter circuit 31 receives mains power input, converts it into direct current $+V_{CC}$ and $-V_{CC}$ that is outputted to the oscillator circuit 32, the oscillator circuit 32 then converting the direct current electricity into a high frequency signal fed to the fluorescent lamp tube 1, thereby driving the fluorescent lamp tube 1 into luminescence. Similarly, as indicated in FIG. 4, the backup circuit 4 has a direct current oscillator 42, a charging circuit 41, and a backup power source (such as a rechargeable battery, etc.) that outputs direct current electricity which is processed through the direct current oscillator 42 and inputted to the fluorescent lamp tube 1 such that the fluorescent lamp tube 1 is driven into luminescence for emergency lighting. As such, since the fluorescent lamp tube 1, the mains power circuit 3, and the backup circuit 4 are widely known devices and, furthermore, are not improvement focal points of the present invention, they shall not be further elaborated.

The controlled switch 5 shown in FIG. 2. is capable of receiving a control signal, the said signal determining whether the said switch is in a closed or an open state; the said controlled switch 5 in the circuit can be a magnetic switch, a relay, or other semiconductor component; a magnetic switch is represented here to facilitate description.

Figure 5:
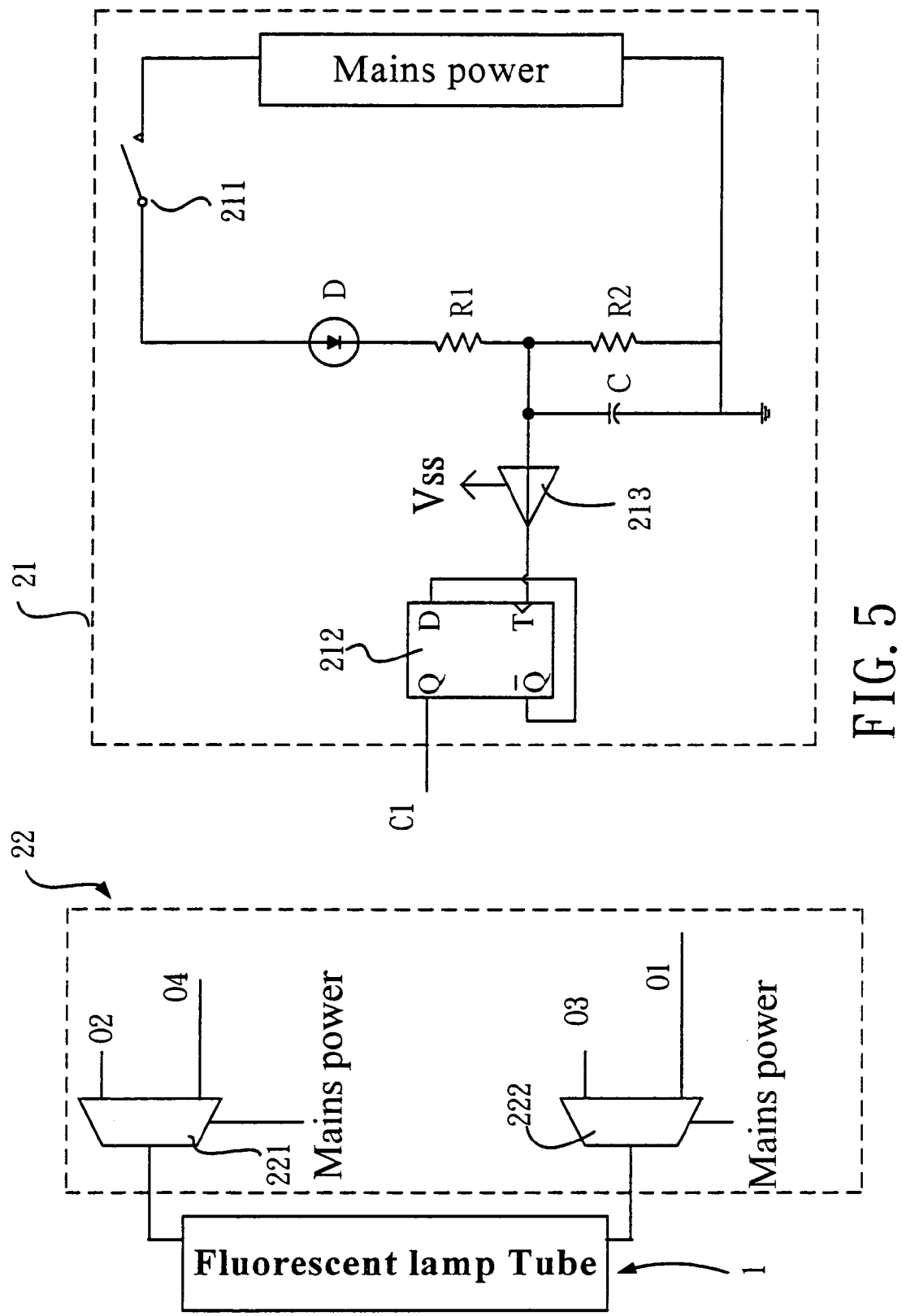
FIG. 5 a schematic diagram of the controller 2 in FIG. 2.

The controller 2 of the invention here provides for user control over fluorescent lamp tube 1 luminescence and non-luminescence when mains power is normally supplied and capable of automatically shifting to the backup circuit 4 backup power source and starting the luminescence of the fluorescent lamp tube 1 during mains power outages; the controller 2 is also capable of automatically selecting a shift of the fluorescent lamp tube 1 to the mains power circuit 3 or the backup circuit 4 due to changes in the electricity supply situation or a different selection by the user. As indicated in FIG. 5 and FIG. 2, the controller 2 of the invention herein is comprised of a control unit 21 and a selector unit 22. The said control unit 21 controls the switching on and off of the fluorescent lamp tube 1 according to the utilization objectives of the user by outputting a signal C1 to the controlled switch 5; as such, the selector unit 22 and the controlled switch 5 distinguishes whether mains power is being supplied based on the different signals received and automatically places the fluorescent lamp tube 1 in either State 1, State 2, or State 3, thereby achieving the functions and performance of the present invention.

The control unit 21 outputs different level electrical control signals to the controlled switch 5 as the user controls the fluorescent lamp on and off, thereby informing the controlled switch 5 of user selections; for example, when the user selects the switching on the fluorescent lamp, the controller 2 correspondingly outputs a high level control signal that closes the controlled switch 5 and causes the fluorescent lamp to illuminate; if the user selects the switching off the fluorescent light, the controller 2 correspondingly outputs a low level control signal that opens the controlled switch 5 and causes the fluorescent lamp to go out; as such, the repeated actuation of the switch effectively turns the fluorescent lamp on and off.

In the embodiment herein, the control unit 21 has a switch 211, the switch 211 providing the user an instantaneous pressing means of controlling the fluorescent lamp such that when mains power is normally supplied, the fluorescent lamp 1 can be controlled on and off. The said switch 211 is an always-on switch; the switch 211 is ordinarily closed and in a state of continuity, only toggling off whenever the switch 211 is pressed; however, since the switch 211 immediately returns to the closed state automatically when it is not pressed, therefore, the new type control unit 21 of the invention herein is also comprised of a D type flip-flop 212, a switch 211, and a Schmitt trigger amplifier 213; its output pin is connected to the trigger pin T of the D type flip-flop 212. The negative output pin $\overline{Q}$ of D type flip-flop 212 goes to input pin D. The control signal C1 shown as outputted from the positive output pin Q of D type flip-flop 212; as such, if the control signal C1 is originally a high level signal (logical 1), the negative output pin $\overline{Q}$ and the input pin D signals will now be a low level signals (logical 0), if the switch 211 button is pressed at this time, then the signal received by the trigger pin T of D type flip-flop 212 will become a low level signal from the original high level signal, and after the switch 211 button is released, the switch is immediately returned to a high level signal (a positive edge trigger signal is generated); when the D type flip-flop 212 receives the positive edge signal generated by the switch 211, then the input pin D signal is transferred to the output pins Q and it is inversed $\overline{Q}$, at which time the control signal C1 outputted by the positive output pin Q becomes a low level signal (logical 0) and the signal connected to the input pin D becomes a high level signal (logical 1); similarly, when the user once again presses the switch 211 and immediately releases it, a positive edge signal is generated again, causing the D type flip-flop 212 once more transfer the input pin D high level signal to the output pins Q and it is inverse $\overline{Q}$. Therefore, the control signal C1 outputted by the output pin Q again becoming a high level signal (logical 1). Consequently, the user repeatedly presses/releases the control unit switch 211 to sequentially output different level electrical signals to the selection unit 22 and, as such, effectively achieves control over the illumination and non-illumination of the fluorescent lamp. It should be noted that although the switch 211 of the embodiment herein is an always on switch, those skilled in the technology can utilize other categories of switches available on the market such as rotary-type switches and prod-type switches, etc. A mere control unit 21 is capable of processing the generated pulse signal and outputting different level electrical control signals, which enable and disable illumination of fluorescent lamp as the user wishes, and shall not be limited by the disclosed objectives herein.

Those familiar with digital circuit design know that the said D type flip-flop 212 circuit can be substituted with other type flip-flop mechanisms such as T type flip-flop; a major aspect of the invention herein is the use of voltage or current pulse signal variation via special processing methods to switch the light source on and off, with the emergency lighting equipment and the ordinary lighting equipment integrated into a single entity; although other circuits can be used as substitutes for the control unit 21 circuit, all utilize voltage or current pulse signal variation to serve as a means of switching the light source on and off, and, the design for the integration of the ordinary lighting device and the emergency lighting device into a single entity shall also be included in the claims of the invention herein.

Additionally, to facilitate further description, first assume that when the control signal C1 is a high level signal, then this represents that the user wants to enable illumination of the fluorescent lamp (as shown in State 2 of FIG. 1), and when the control signal C1 is a low level signal, then this represents that the user wants to disable illumination of the fluorescent lamp (as shown in State 3 of FIG. 1).

The selector unit 22 determines whether the fluorescent lamp tube 1 is connected to the mains power circuit 3 or the backup circuit 4 based on the presence/absence of mains power, and the controlled switch 5 is in a closed or open state based on the received signal C1, the combination above enabling the fluorescent lamp to cycle through States 1, 2, and 3, as indicated in FIG. 1, thus the twin objectives of ordinary lighting or emergency lighting can be achieved. To elaborate, during a mains power outage, the fluorescent lamp tube 1 circuit is automatically shifted via the selector unit 22 to the backup circuit 4, the electricity supplied by the backup power source effectively producing emergency lighting (as shown in State 1 of FIG. 1); when mains power is restored to normal, the fluorescent lamp tube 1 circuit is automatically shifted via the selector unit 22 to the mains power circuit 3; when the mains power is normally supplied and, furthermore, the user wants to disable illumination of the fluorescent lamp, the fluorescent lamp tube 1 is not supplied electricity and extinguished because the controlled switch 5 is in an open state (as shown in State 3 of FIG. 1). The selector unit 22 embodiment herein has two selectors (the selectors in the circuit can be utilized with different components such as CMOS or bipolar semiconductors, with relays serving as selectors in the present embodiment). The said relays 221 and 222 have two input pins, one output pin, and a selector pin and, furthermore, two of the output pins are respectively connected to the two pins of the fluorescent lamp tube 1, the input pins at the right side and upper extent of the two relays 221 and 222 are respectively connected to the two output pins O2 and O3 of the backup circuit 4 (as shown in FIG. 4 and FIG. 5), and the input pins at the right side and lower extent of the two relays 221 and 222 are respectively connected to the two output pins O1 and O4 of the mains power circuit 3 (as shown in FIG. 3 and FIG. 5). Additionally, the select pins at the lower extent of the two relays 221 and 222 are respectively connected to mains power and when mains power is normally supplied, the relay 221 and 222 output pins are connected to the input pins O1 and O4 at the right side and lower extent, and power is supplied from the mains power circuit; during power outages, the relay 221 and 222 output pins are connected to the input pins O2 and O3 at the right side and upper extent, enabling the connection of the two pins of the fluorescent lamp tube 1 to the backup circuit 4 output pins O2 and O3, and power is supplied from the backup power source. The control pins of the controlled switch 5 (refer to FIG. 2 and FIG. 5) is connected to the control signal C1, which is the output pin Q of the D type flip-flop 212; when the control signal C1 is a high level signal, the controlled switch 5 is in the closed state, The mains power circuit 3 receives the main electricity and drives the output pin O1 and O4, and the output pins of relay 221 and 222 are respectively connected to lower right pins of the relays, the fluorescent lamp tube is driven by mains power. (as shown in State 2 of FIG. 1); and when the control signal C1 is a low level signal, the controlled switch 5 is in the open state, mains electricity is not supplied to the mains power circuit 3, and the fluorescent lamp remains extinguished because no power is furnished (as shown in State 3 of FIG. 1).

Based on the said structural components and their interrelationship, the toggling states of the fluorescent lamp are further elaborated. First, if mains power is normally supplied, then the relay 221 and 222 output terminals are automatically connected to the input pins at the right side and lower extent, following which the determination of whether the fluorescent lamp tube 1 is switched on or off is based on the high/low control signal C1 received by the controlled switch 5; when the user wants to switch on the fluorescent lamp and momentarily presses the switch 211, the control unit 21 outputs a high level control signal C1 and the controlled switch 5 is in the closed state, enabling the connection of mains power circuit to the mains power and output the current to the fluorescent lamp tube 1 via output pins O1 and O4 via the relays 221 and 222 which is in the State 2 indicated in FIG. 1 to thereby switch on, at which time, if the user wants to switch off the fluorescent lamp and momentarily presses the switch 211 again, the control signal C1 outputted by the control unit 21 becomes a low level signal and the controlled switch 5 is in the open state, disconnecting the mains power from the mains power circuit 3 and the fluorescent lamp is extinguishing because electricity is no longer supplied (as shown in State 3 of FIG. 1). Consequently, under situations in which mains power is normally supplied, the user momentarily presses the switch 211 several times to control the fluorescent lamp, as shown in the transition between State 2 and State 3 of FIG. 1, and thereby toggle fluorescent lamp on and off. In the event of a mains power outage (power failure), then since the relay 221 and 222 output pins are automatically toggled into connection with the backup circuit 4 output pins O2 and O3 at the right side and upper extent and, as such, the backup circuit 4 is connected to the fluorescent lamp tube 1 via the relay 221 and 222 left side output terminals and supplied electricity by the backup circuit 4, the fluorescent lamp thereby enters the emergency lighting mode as shown in State 1 of FIG. 1.

Based on the foregoing section, the fluorescent lamp of the invention herein ordinarily (when mains power is normally supplied) serves as lighting equipment for user operation and usage, but during power outages, due to the function of the selector unit 22 and the backup circuit 4, automatically serves as emergency lighting; as such, the user does not have to purchase extra emergency lighting equipment and saves the cost and, furthermore, since the design herein does not require a third power line, the present invention is compatible with existent buildings and original wiring circuits do not have to be renovated; moreover, the illumination range and the applications scope of fluorescent lamps is large.

Additionally, although the said embodiment only discloses an illumination appliance having an emergency light function, those skilled in the technology are knowledgeable that the controller 2 and the backup circuit 4 can be integrated into a unitary control device and utilized with existent fluorescent lamps, or that the controller 2, the mains power circuit 3, and the backup circuit 4 can be combined into a single device for utilization with fluorescent lamps; the controller 2 uses two relays to facilitate configuration and actually when the controller 2 is integrated with the mains power circuit 3 and the backup circuit 4, the quantity of relays are reduced and semiconductor components can be substituted for the relays; therefore, the description of the embodiment herein shall not be construed as a limitation of the invention herein; additionally, the main application of the embodiment herein consists of fluorescent lamps and since fluorescent lamp photoelectric conversion efficiency is excellent, the structure of the invention herein can be modified and still achieve the same objectives, wherein the general approaches are as follows:

First, if the fluorescent lamp tube 1 remains utilized and the mains power circuit 3 (switching ballast/electrical ballast) is changed to a conventional ballast; when utilizing this arrangement, a starter is added to the fluorescent lamp tube 1 power input pin.

Second, if the fluorescent lamp tube 1 is changed to a different type of light bulb or other illuminant such as an LED, then an equivalent transformer replaces the mains power circuit 3 and electricity is then supplied from mains power via the transformer or a rectifier and, furthermore, the backup circuit 4 direct current oscillator 42 is modified or eliminated and replaced by a equivalent backup power source such as a rechargeable battery or other power supply, etc. to thereby enable the controller 2 to function identically.

Third, if both the fluorescent lamp tube 1 and the mains power circuit 3 are integrated into a single product that is sold alone on the market, then the backup circuit 4 direct current oscillator 42 is modified such that when mains power outage occurs, the backup circuit 4 is capable of outputting the same current as the mains power, thereby enabling the controller 2 to function identically.

However, in the preceding description, the most preferred embodiment of the invention herein is presented as an example and shall not be construed as a limitation on the claims of the present invention, the said embodiment utilizing circuit breakers, ON-OFF power switches, or other approaches to generate voltage or current pulse signals, such that after processing, the said illumination appliance is turned on and off based on user intent when mains power is normally supplied and the power circuit is automatically shifted to the backup circuit and supplied power from the backup power source and thus effectively produces emergency lighting during mains power outages. Additionally, the power circuit is automatically shifted to the mains circuit when mains power is restored, the mains power enabling ordinary lighting functions. All simple modifications and adaptation based on the said descriptive content of the invention herein shall remain protected by the patented claims of the present invention.

The invention claimed is:

1. An emergency lighting function illumination appliance comprised of:

an illumination appliance;

a mains power circuit that receives mains power and processes the said mains power appropriately to drive the said illumination appliance;

a backup circuit that is a backup power source having a battery and capable of a suitable output to drive the said illumination appliance;

a controller shunted between the said illumination appliance and both the said mains power circuit and said backup circuit, the said controller comprised of a control unit and a selector unit, the features of which are: the said control unit has a switch and when the said switch is toggled, a voltage or current pulse signal is generated, the said control unit receives the pulse signal and outputs a control signal that has a different level than level before toggling, the said signal is connected to a controlled switch responsible for terminating or initiating the said mains power unit, and the said selector unit determines whether the circuit of the said illumination appliance is connected to either the said backup circuit or the said mains power circuit based on the presence or absence of mains power; when mains power is normally supplied, the said mains power circuit is initiated or terminated by control signals outputted by the said control unit; when mains power fails, the said selector unit connects the said illumination appliance to the said backup circuit so it receives backup power for emergency lighting, and when mains power supply is normally supplied, the said controller operates the said illumination appliance by enabling the said illumination appliance to receive electricity processed via the said mains power circuit to providing lighting or not receive any electricity and remain extinguished, according to user intent.

2. As mentioned in claim 1 of the emergency lighting function illumination appliance of the invention herein, the said selector unit consists of one or more selectors and each selector has two input pins, one selector pin, and one output pin; the selector output pin is respectively connected to the two input pins of the said illumination appliance, one input pin of the selector is respectively connected to the said backup circuit output pin, the other input pin is connected to the said mains power circuit output pin and, furthermore, the said selector pin of the said selector is connected to the said mains power such that when the said mains power is supplied, the output pin of the said selector is connected to the output pin of the said mains power circuit and when mains power fails, the output pin of the said selector is connected to the output pin of the said backup circuit, the said backup circuit serving as a reserve power source that supplies the said illumination appliance.

* * * * *